(12) United States Patent
Cheng

(10) Patent No.: US 7,525,795 B2
(45) Date of Patent: Apr. 28, 2009

(54) HARD DISK DRIVE HOLDING DEVICE

(75) Inventor: Chun-Yi Cheng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 367 days.

(21) Appl. No.: 11/400,319

(22) Filed: Apr. 10, 2006

(65) Prior Publication Data

US 2006/0227502 A1 Oct. 12, 2006

(30) Foreign Application Priority Data

Apr. 12, 2005 (TW) ............... 94111544 A

(51) Int. Cl.
*H05K 5/00* (2006.01)
*H05K 7/00* (2006.01)
*G06F 1/16* (2006.01)

(52) U.S. Cl. ..................... 361/685; 248/27.1
(58) Field of Classification Search ........... 361/685; 248/27.1, 27.3, 298.1
See application file for complete search history.

(56) References Cited

U.S. PATENT DOCUMENTS

| 5,136,466 | A | * | 8/1992 | Remise et al. ............... 361/685 |
| 5,560,572 | A | * | 10/1996 | Osborn et al. ............... 248/27.3 |
| 5,682,291 | A | * | 10/1997 | Jeffries et al. ............... 361/685 |
| 6,256,195 | B1 | | 7/2001 | Liao |
| 6,377,449 | B1 | * | 4/2002 | Liao et al. ............... 361/685 |
| 6,404,641 | B1 | * | 6/2002 | Fisk et al. ............... 361/727 |
| 6,616,106 | B1 | * | 9/2003 | Dean et al. ............... 361/685 |
| 6,721,177 | B1 | * | 4/2004 | Wang et al. ............... 361/685 |
| 6,795,309 | B2 | * | 9/2004 | Hartung et al. ............... 361/685 |
| 6,956,737 | B2 | * | 10/2005 | Chen et al. ............... 361/685 |
| 7,068,502 | B2 | * | 6/2006 | Chen et al. ............... 361/685 |
| 7,360,295 | B2 | * | 4/2008 | Reilley ............... 361/685 |
| 7,365,971 | B2 | * | 4/2008 | Chen et al. ............... 361/685 |

FOREIGN PATENT DOCUMENTS

| CN | 2689320 Y | 3/2005 |
| TW | 433526 Y | 4/1988 |
| TW | M254868 U | 2/2004 |

* cited by examiner

*Primary Examiner*—Anatoly Vortman
*Assistant Examiner*—Adrian S Wilson
(74) *Attorney, Agent, or Firm*—Muncy, Geissler, Olds & Lowe, PLLC

(57) ABSTRACT

A hard disk drive holding device includes a holder and at least a sliding trench. A hard disk drive is installed into the device quickly and simply through a sliding trench with an opening on a surface of the holder and is constrained tightly due to an inclination of the lateral inner surface in the sliding trench. The sliding trench may also narrow such that the hard disk drive is also constrained in a different direction and is held firmer.

14 Claims, 3 Drawing Sheets

HARD DISK DRIVE HOLDING DEVICE

RELATED APPLICATIONS

The present application is based on, and claims priority from, Taiwan Application Serial Number 94111544, filed Apr. 12, 2005, the disclosure of which is hereby incorporated by reference herein in its entirety.

BACKGROUND

1. Field of Invention

The present invention relates to a hard disk drive holding device. More particularly, the present invention relates to a hard disk drive holding device in which a hard disk drive can be quickly installed.

2. Description of Related Art

A hard disk drive is a device for storing data, such as data necessary to execute a program, in a computer system. Once the hard disk drive is damaged, data therein may not be accessible by the computer system. Therefore the hard disk drive is the most important storage device in a computer, and the higher the capacity of the hard disk drive, the more data that can be stored therein.

A hard disk drive is mainly composed of a disk, a head, a motor and wires, all of which are sealed within a shell. When data are read from the hard disk drive, locations of data are identified first and then the head moves to the specified locations to read data. When data are stored in the hard disk drive, available locations are determined first and then the head moves to the specified locations to store data.

If a hard disk drive is impacted during transportation without any buffer or damper for protection, a collision between the head and the disk occurs and damages the hard disk drive and the data stored therein. Conventionally, a frame with openings on the sides is used to hold the hard disk drive, and screw holes on both sides of the hard disk drive are aligned with the openings so that screws are put into the openings to firmly fix the hard disk drive onto the frame. However, users cannot install or uninstall a hard disk drive without first inserting or removing the screws, such as when the hard disk drive is replaced or repaired. Therefore, the conventional structure is not user-friendly or convenient.

For the foregoing reasons, there is a need for a hard disk drive holding device which enables convenient and user-friendly installation and removal of the hard disk drive and safely fixes the hard disk drive to reduce device failure.

SUMMARY

It is therefore an objective of the present invention to provide a hard disk drive holding device for holding a hard disk drive firmly.

It is another objective of the present invention to provide a hard disk drive holding device for quickly installing and uninstalling a hard disk drive.

In accordance with the foregoing and other objectives of the present invention, a hard disk drive holding device is provided for fixing a hard disk drive in a computer system. A hard disk drive holding device includes a holder and at least one sliding trench. The holder is for holding a hard disk drive and the sliding trench disposed on an inner surface of the holder has an opening on a surface of the holder. A sliding trench inner surface inclines extendedly to a center of the holder by an inclination.

In another aspect, the invention is a hard disk drive storage device in which the hard disk drive holding device is integrated. The hard disk drive storage device includes a holder, a left sliding trench and a right sliding trench. Each of the left sliding trench and the right sliding trench has an opening and a turning. The hard disk drive with protrusions on both sides enters the holder at the openings and eventually is fastened at a predefined position.

In conclusion, the hard disk drive holding device of the invention includes a sliding trench with an opening which provides a guidance for the hard disk drive to be placed into or be taken out of the holding device directly and immediately. A constraint due to an inclination of the sliding trench also provides a high safety reliability of the fixed hard disk drive. Therefore, the invention can be applied in a computer equipment to obtain more convenient installation, removal and repair of a hard disk drive and reduce damage to the same in transportation.

It is to be understood that both the foregoing general description and the following detailed description are by examples and are intended to provide further explanation of the invention as claimed.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1:
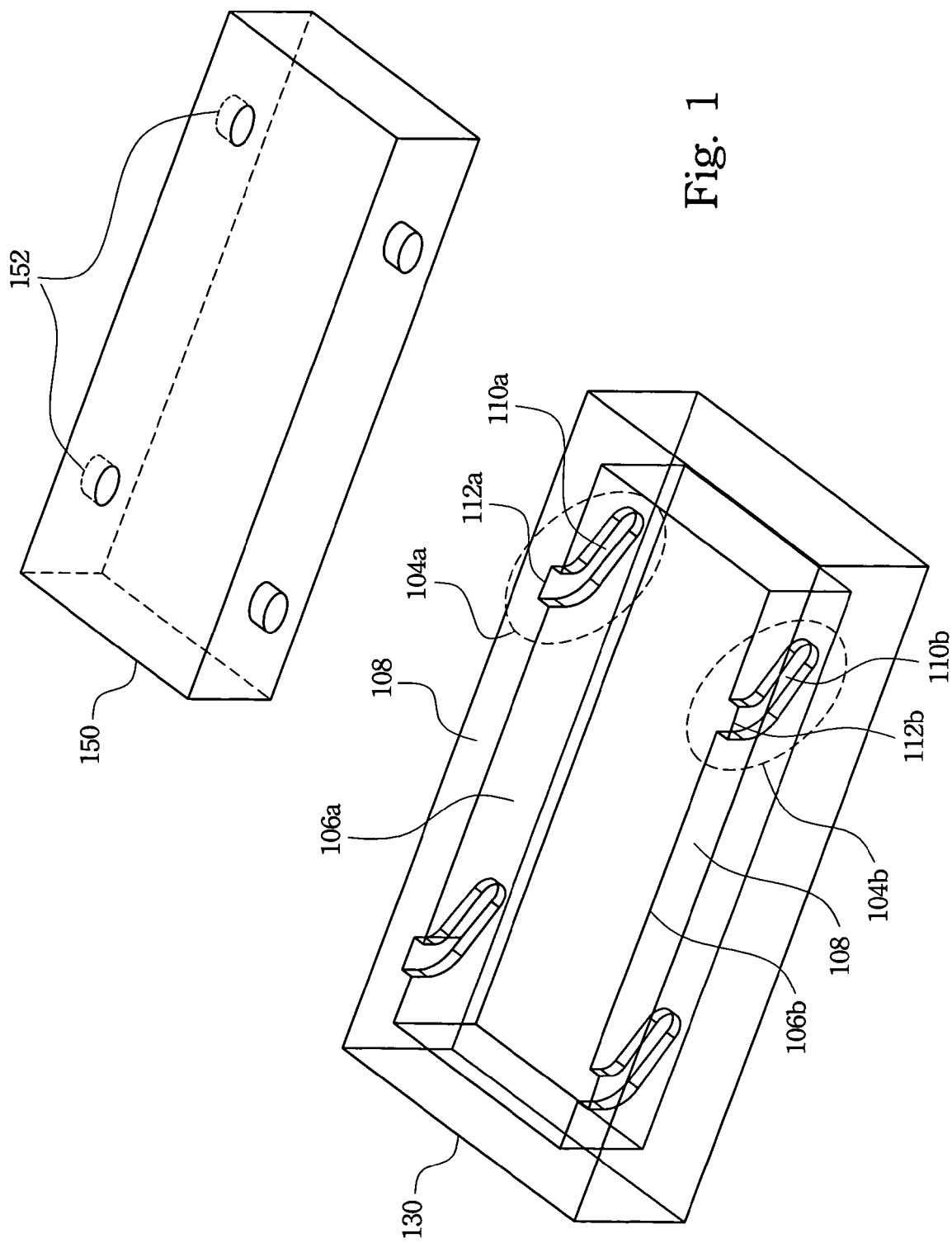
FIG. 1 is a schematic diagram of a hard disk drive holding device in accordance with a preferred embodiment of the present invention.

The present invention discloses a hard disk drive holding device which is applied in a computer for installing and uninstalling a hard disk drive conveniently and fixing the same safely and effectively as well. Reference will now be made in detail to the present preferred embodiments of the invention, examples of which are illustrated in the accompanying drawings. Wherever possible, the same reference numbers are used in the drawings and the description to refer to the same or like parts.

Figure 2A:
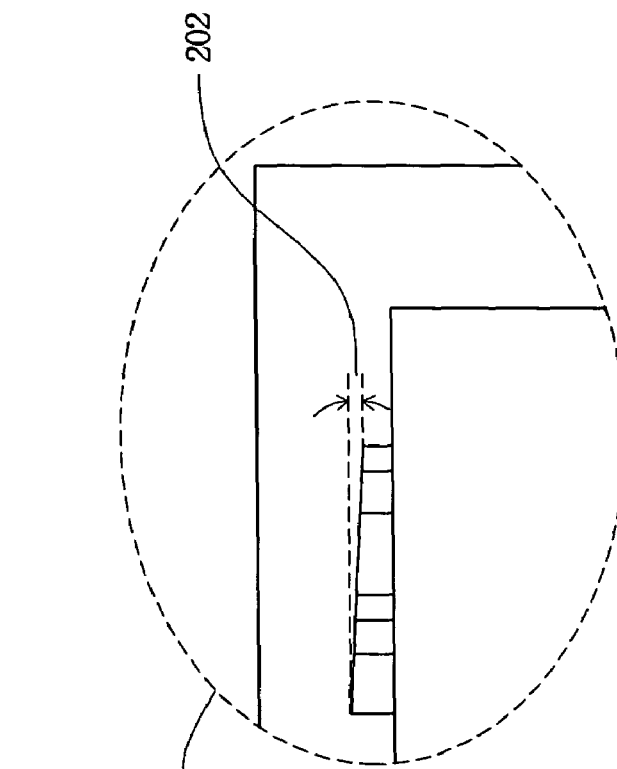
FIG. 2A is a top view of the hard disk drive holding device in FIG. 1.
Figure 2B:
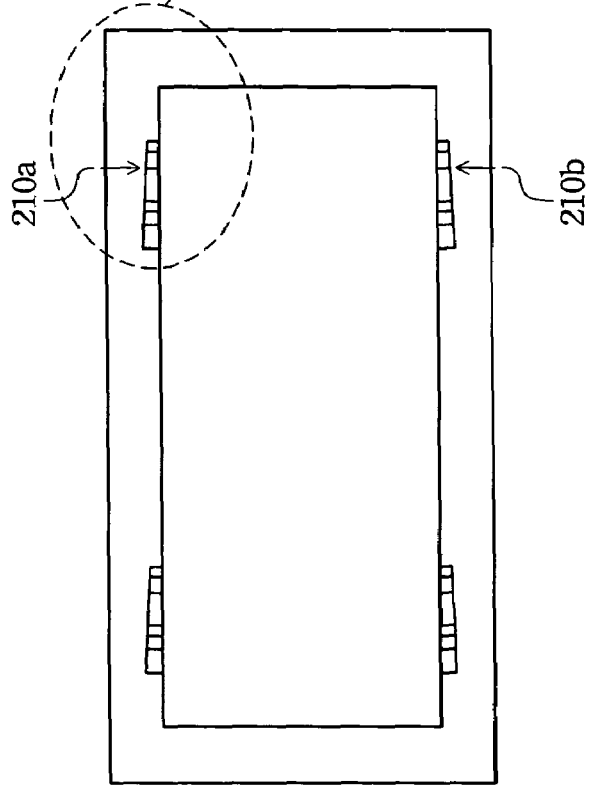
FIG. 2B is a front view of the hard disk drive holding device in FIG. 1.
Figure 2C:
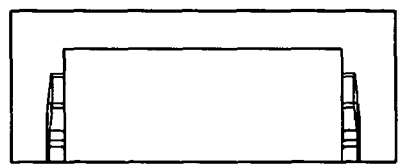
FIG. 2C is a side view of the hard disk drive holding device in FIG. 1.

FIG. 1 is a schematic diagram of a hard disk drive holding device in accordance with a preferred embodiment of the present invention. FIGS. 2A to 2C are respectively a top view, front view and side view of the hard disk drive holding device in FIG. 1. For clear description of the embodiment, emphasis is made on an inclination 202 in FIG. 2A and a turning of a sliding trench in FIG. 2B.

Referring to FIG. 1 and FIGS. 2A to 2C, a hard disk drive holding device includes a holder 130, such as a storage box, for holding a hard disk drive 150 and at least a sliding trench 104*a*. The sliding trench 104*a* is disposed on a sidewall 106*a* of the holder 130, preferably on an inner surface of the holder 130, and has an opening 112*a* on a surface of the holder 130 such as a top surface 108. A trench inner surface 110*a* of the sliding trench 104*a* extendedly inclines to a center of the holder 130 by an inclination 202 (shown in FIG. 2A). That is, an interval between the trench inner surface 110a and the trench inner surface 110b gradually decreases from the openings (112a, 112b) of the top surface 108 to a bottom of each sliding trench (104a, 104b) as illustrated in FIG. 1 and FIG. 2A.

Hereinafter, a hard disk drive holding device with two pairs of symmetric sliding trenches are more explicitly clarified in the following preferred embodiments. However, the embodiments are merely given to illustrate various applications of the invention rather than to be interpreted as limiting the scope of the appended claims. For example, the number of sliding trenches may be increased or reduced to achieve the same purpose.

In the embodiments, the hard disk drive is integrated into a hard disk drive storage device, such as a HDD box, and only two sliding trenches on both sides are presented for demonstration; that is, a left sliding trench and a right sliding trench. As is understood by a person skilled in the art, the other pair of symmetric sliding trenches has the same structural features.

As shown in FIG. 1, the hard disk drive storage device includes a holder 130, a left sliding trench 104a and a right sliding trench 104b. The holder 130 has a left sidewall 106a on which the left sliding trench 104a is disposed and a right sidewall 106b on which the right sliding trench 104b is disposed. The left sliding trench 104a and the right sliding trench 104b may also be disposed on an outer side of the holder 130.

A turning 204 (shown in FIG. 2B) is formed in both the left sliding trench 104a and the right sliding trench 104b for constraining the hard disk drive 150 and has an angle of about 10 to 30 degrees measured from inlet direction of opening. The left sliding trench 104a disposed on the left sidewall 106a has an opening 112a and the right sliding trench 104b disposed on the right sidewall 106b has an opening 112b, both of which open on the top surface 108 of the holder 130. Both a left trench inner surface 110a of the left sliding trench 104a and a right trench inner surface 110b of the right sliding trench 104b incline to a center of the holder 130 extendedly by an inclination 202 (shown in FIG. 2A) for clamping the hard disk drive 150. That is, both the left trench inner surface 110a and the right trench inner surface 110b incline toward each other such that an interval between the trench inner surface 110a and the trench inner surface 110b can be gradually decreased from the openings (112a, 112b) of the top surface 108 to a bottom of each sliding trench (104a, 104b)for clamping the hard disk drive 150 as illustrated in FIG. 1 and FIG. 2A.

As shown in FIG. 1, the hard disk drive 150 has two protrusions 152 disposed on both sides such as screws with a rounded end. When the hard disk drive 150 is to be installed in the holder 130, the protrusions 152 are put into and slide in the sliding trenches 104a and 104b from the left opening 112a and the right opening 112b on the top surface 108. When reaching the predefined positions 210a and 210b in the sliding trenches 104a and 104b, the protrusions 152 are coupled with and are clamped in the sliding trenches 104a and 104b due to the inclination 202 of the left trench inner surface 110a and the right trench inner surface 110b so that the hard disk drive 150 is provided with an in-plane constraint. The angle of the inclination 202 is 1 to 5 degrees, preferably 2 to 3 degrees.

Further, the hard disk drive holding device may be integrated into a plug-in hard drive module. The plug-in hard drive module includes the hard drive storage device above and a hard disk drive which is positioned in the storage device. Optionally, a fastening device such as a latch can be added to prevent the protrusions from sliding out of the sliding trenches and enhances the fixing effect.

Figure 3:
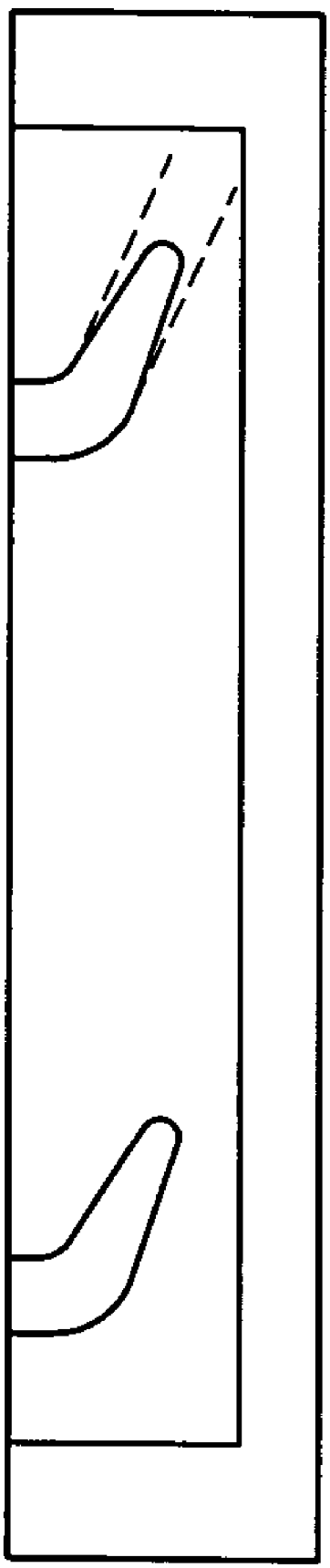
FIG. 3 is a side view of a sliding trench in accordance with another preferred embodiment of the present invention.

FIG. 3 is a side view of a sliding trench in accordance with another preferred embodiment of the present invention, illustrating a narrowing of the sliding trenches. The left sliding trench and the right sliding trench can narrow along the sliding trench to the bottom thereof for providing a constraint in the direction of the height of the sliding trench which is different from the constraint direction due to the inclination. In other words, constraints in two directions are provided simultaneously so that the fixing effect is greater. The sliding trenches may narrow to a tapered or curved end and have a narrowing angle of 1 to 5 degrees preferably.

The present invention has the following advantage. Through sliding trenches with openings, a hard disk drive is more conveniently and quickly installed and uninstalled without the conventional need to fasten with screws. Inclinations of sliding trenches on both sides form a tapered structure that increases the firmness of hard disk drive holding so that possible damage to a device and data loss due to collision during transportation are reduced or even eliminated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hard disk drive holding device, comprising:
   a holder; and
   at least a sliding trench disposed on an inner sidewall of the holder and having an opening on a top surface of the holder and a turning for constraining a hard disk drive, the sliding trench having a trench inner surface facing an opposite inner sidewall of the holder,
   wherein the trench inner surface inclines extendedly to a center of the holder by an inclination such that a protrusion of the hard disk drive slides into the sliding trench from the opening and is pressed against by the inclination of the trench inner surface.

2. The hard disk drive holding device of claim 1, wherein the inclination has an angle of one degree to five degrees.

3. The hard disk drive holding device of claim 1, wherein the inclination has an angle of two degrees to three degrees.

4. The hard disk drive holding device of claim 1, wherein the pair of sliding trenches are disposed symmetrically to the holder.

5. The hard disk drive holding device of claim 1, wherein the sliding trench narrows.

6. The hard disk drive holding device of claim 5, wherein the sliding trench narrows to be tapered.

7. The hard disk drive holding device of claim 5, wherein the sliding trench narrows to be curved.

8. A hard disk drive holding device, comprising:
   a holder; and
   two sliding trenches disposed respectively on two opposite inner sidewalls of the holder and each sliding trench having an opening on a surface of the holder,
   wherein each of the two sliding trenches has a trench inner surface facing each other, and each trench inner surface inclines extendedly to a center of the holder by an inclination and two opposite protrusions of the hard disk drive slide into the sliding trench from the opening and are respectively pressed against by the inclination of each trench inner surface.

9. The hard disk drive holding device of claim 8, wherein the two sliding trenches narrow.

10. The hard disk drive holding device of claim 8, wherein the two sliding trenches narrow to be tapered or curved.

11. The hard disk drive holding device of claim 8, wherein the inclination has an angle of one degree to five degrees.

12. The hard disk drive holding device of claim 11, wherein the inclination has an angle of two degrees to three degrees.

13. A hard disk drive holding device, comprising:

a holder; and at least a pair of sliding trenches disposed respectively on two opposite inner sidewalls of the holder and each sliding trench having a trench inner surface and an opening on a surface of the holder, wherein an interval between the two trench inner surfaces gradually decreases from the opening to a bottom of each sliding trench such that a pair of protrusions of the hard disk drive slides into the pair of sliding trenches from the opening and are clamped.

14. The hard disk drive holding device of claim 13, wherein the two trench inner surfaces incline toward each other to gradually decreases the interval between the two trench inner surfaces from the opening to the bottom of each sliding trench.

* * * * *